3 Sheets—Sheet 1.

T. SHAW.
Manufacture of Fork.

No. 205,001. Patented June 18, 1878.

Witnesses
James M. Hicks

Inventor
Thomas Shaw
by E. L. Sherman
Attorney

N. PETERS, PHOTO-LITHOGRAPHER, WASHINGTON, D. C.

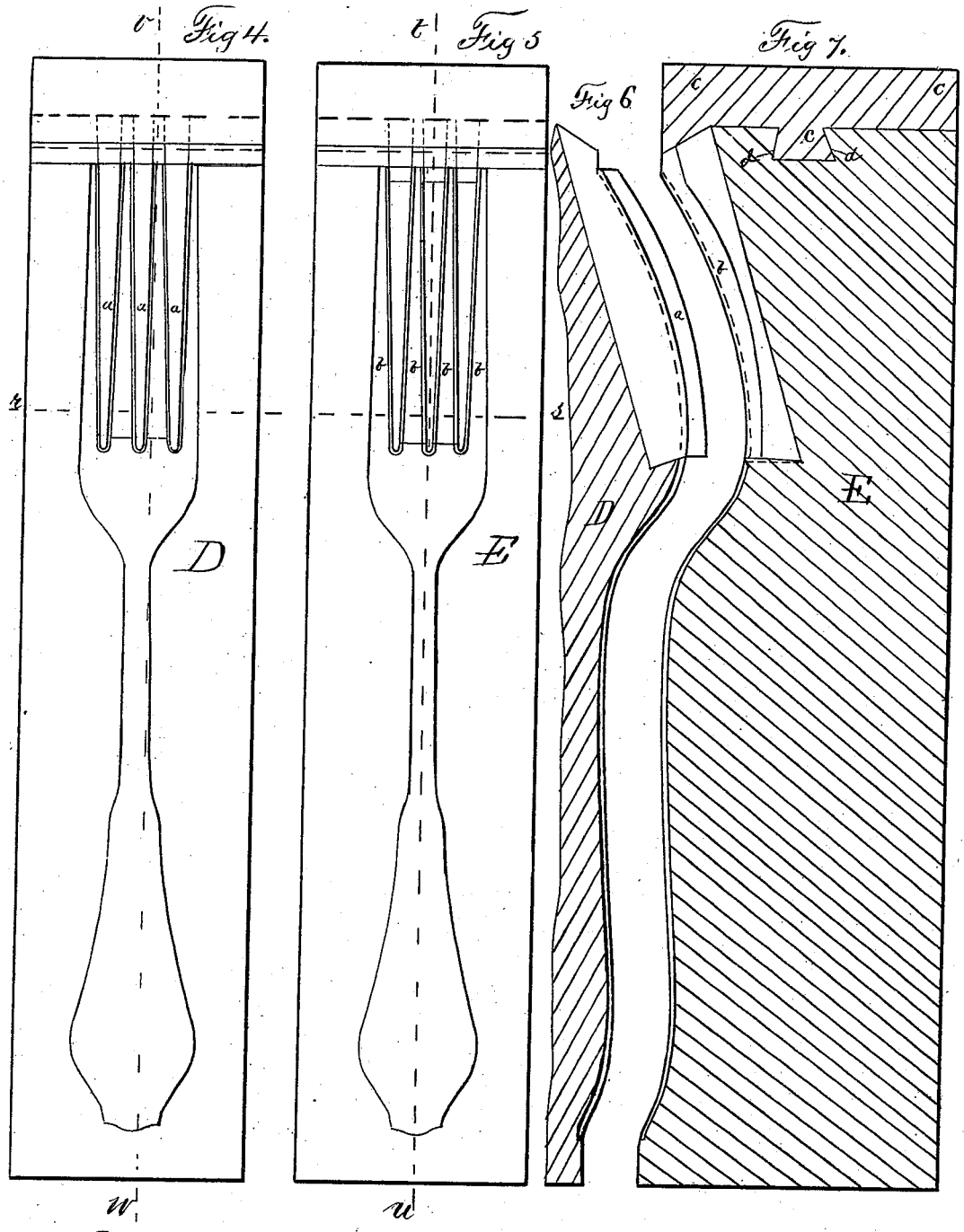

3 Sheets—Sheet 3.
T. SHAW.
Manufacture of Fork.
No. 205,001. Patented June 18, 1878.
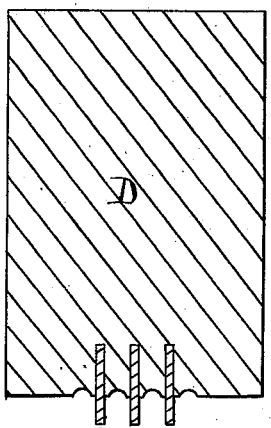
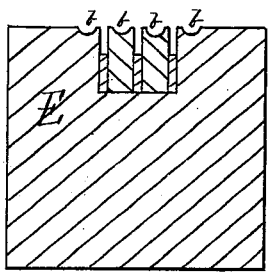
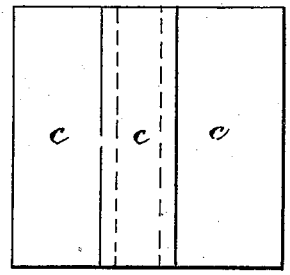
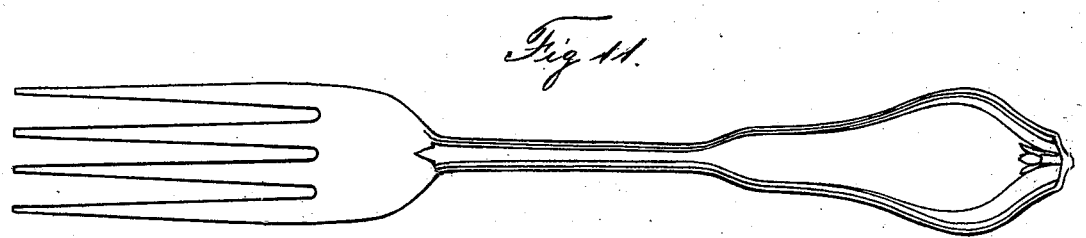
Witnesses.
James M. Hicks
Henry ...
Inventor
Thomas Shaw
by E. L. Sherman
Attorney
N. PETERS, PHOTO-LITHOGRAPHER, WASHINGTON, D. C.

UNITED STATES PATENT OFFICE.

THOMAS SHAW, OF ORANGE, NEW JERSEY.

IMPROVEMENT IN MANUFACTURE OF FORKS.

Specification forming part of Letters Patent No. 205,001, dated June 11, 1878; application filed January 26, 1878.

*To all whom it may concern:*

Be it known that I, THOMAS SHAW, of Orange, in the county of Essex and State of New Jersey, have invented a new and useful Improvement in the Manufacture of Forks, which improvement is fully set forth in the following specification, reference being had to the accompanying drawings, in which—

Figure 1:
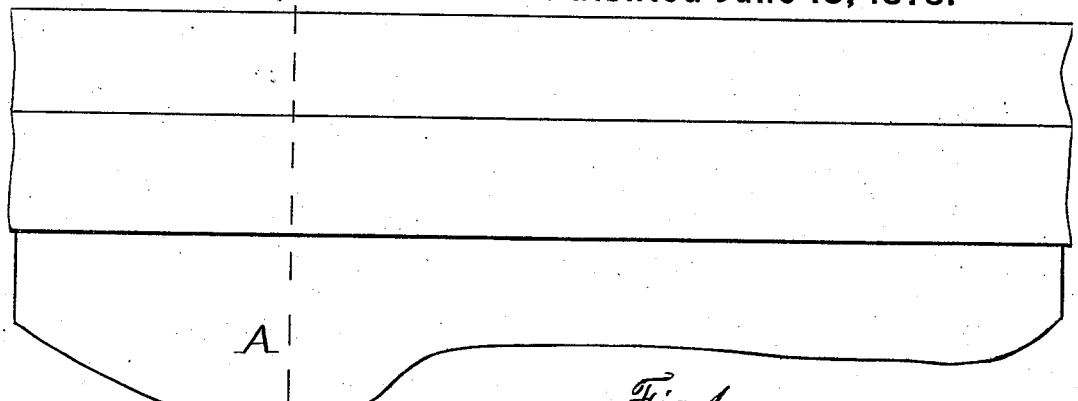
Figure 2:
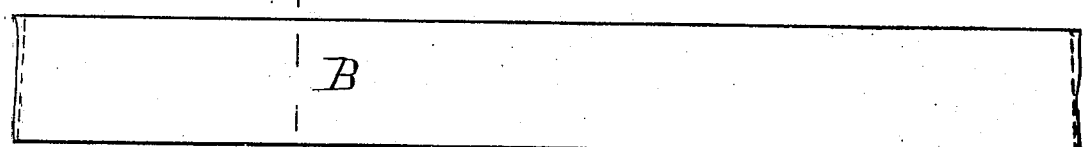
Figure 3:
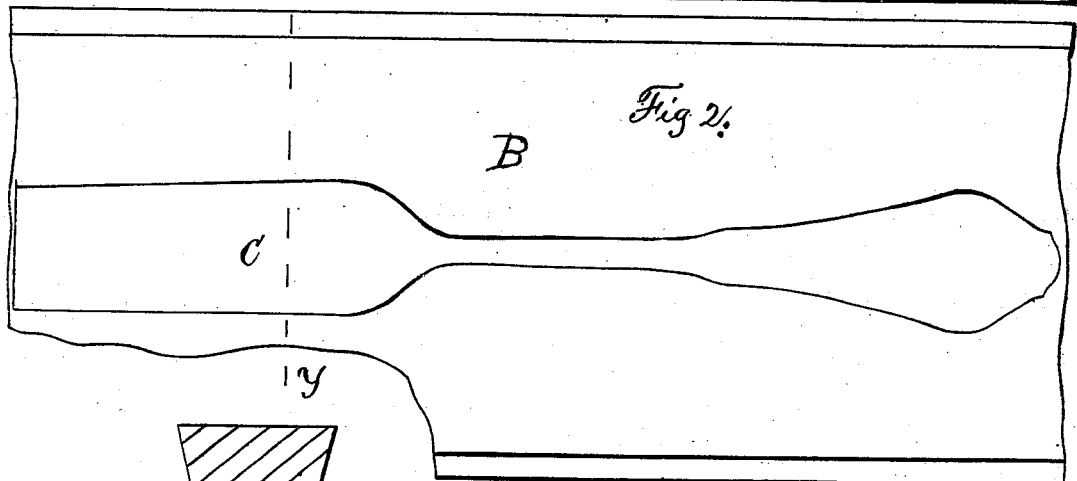
Figure 3:
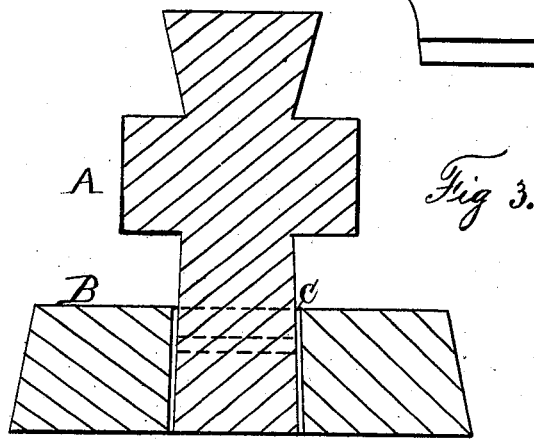

Figure 1 represents a front view of the male and female die for cutting the fork. Fig. 2 represents a top view of the female die of Fig. 1, showing the opening. Fig. 3 represents a sectional view of A B, Fig. 1, through the dotted line $x\ y$. Fig. 4 represents a top view of the upper embossing and cutting die. Fig. 5 represents a top view of the under embossing and cutting die. Fig. 6 represents a sectional view of Fig. 4 through the dotted line $v\ w$. Fig. 7 represents a sectional view of Fig. 5 through the dotted line $t\ u$. Fig. 8 represents a sectional view of Figs. 4 and 5, when in position, through the dotted line $r\ s$. Fig. 9 represents a front view of the key or clamp. Fig. 10 represents an end view of the key or clamp. Fig. 11 represents a complete fork as made by my process.

The nature and object of my invention consist in the peculiar construction and formation of the dies for cutting the tines and ornamenting the forks, the cutting of the tines and the ornamentation of the fork being done at one operation.

I will explain my invention by reference being had to the drawings.

The dies D and E contain the desired embossing or ornamentation of the handle of the fork, while the pieces between the cutters or plungers of each die have the depressions necessary to form the rounded surface of the tines.

The cutters or plungers $a\ a\ b\ b$, Figs. 4, 5, and 6, as well as the pieces between them, are made in separate pieces, so that if one is broken or injured it can be removed and another put in its place. Thus the expense of a whole and complete die is saved.

To secure these cutters or plungers and the separators in their proper position, I construct them with the back edges so formed as to rest in a recess in the main die, while the forward edges are held down by a key or clamp, $c$, running across the entire end of the die, which holds the cutters or plungers firmly in place by means of the dovetail $d$, and thus prevents them from moving in either a longitudinal or upward direction. Thus, by the use of one key or clamp, all the adjustable parts of the die are kept firmly in place without requiring the use of bolts or locks or keys to each movable piece.

What I claim as my invention, and desire to secure by Letters Patent, is—

1. A die for cutting forks, with one or more removable cutters or plungers, with separators, having their rear ends so formed as to rest in the body of the die, and the forward ends held firmly in position by means of a key or clamp, all constructed, arranged, and operated substantially as and in the manner and for the objects set forth.

2. The combination, with an embossing or ornamenting die, of removable cutters or plungers, secured by a key or clamp, arranged and constructed substantially as described.

THOMAS SHAW.

Witnesses:
E. L. SHERMAN,
GEORGE A. GARDINER.